July 4, 1967 L. SINGER 3,329,044
CABLE HANDLING DEVICE
Filed Oct. 4, 1965
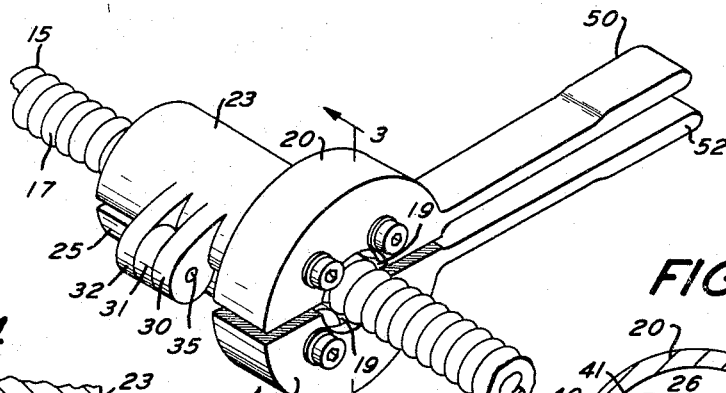
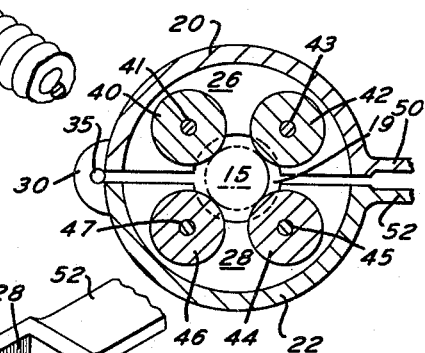
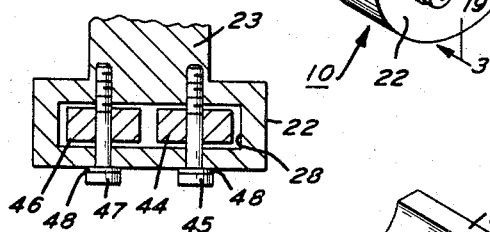
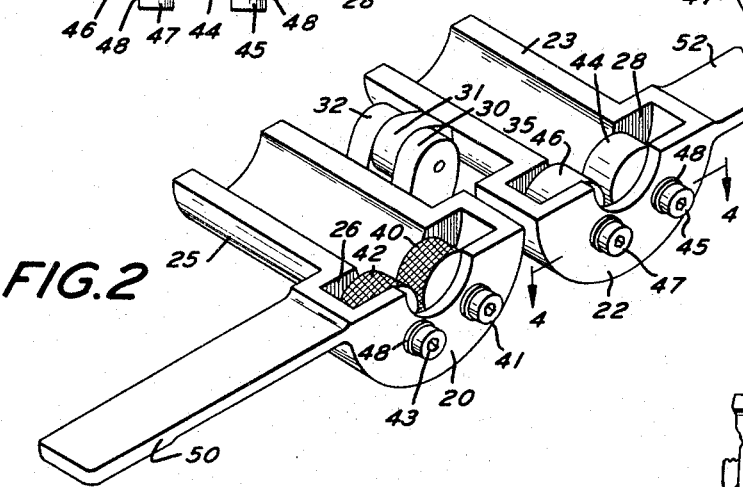
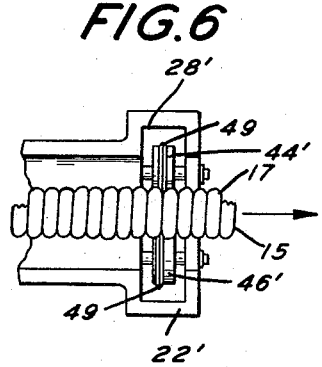
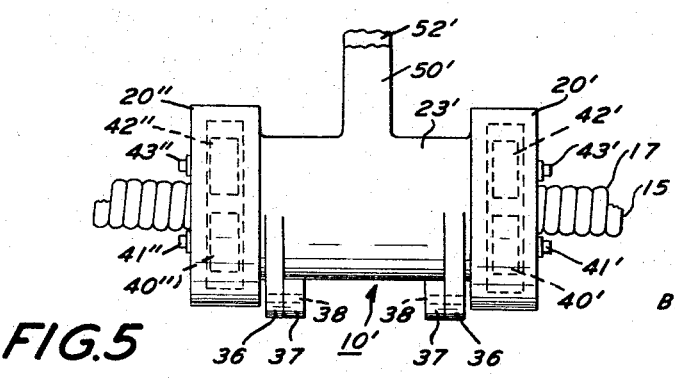
INVENTOR
LOUIS SINGER
BY Jacob Trachtman
ATTORNEY

United States Patent Office 3,329,044
Patented July 4, 1967

3,329,044
CABLE HANDLING DEVICE
Louis Singer, 4800 N. 11th St.,
Philadelphia, Pa. 19141
Filed Oct. 4, 1965, Ser. No. 492,510
15 Claims. (Cl. 81—3)

This invention relates, in general, to a clamping device and more particularly, to a hand implement for the clamping and placement of a rotating cable.

Clogged drain and sewer piping, or the like, are frequently unclogged and cleared by the insertion of a length of flexible cable, generally referred to as a "plumber's snake." Naturally, the complete insertion of the cable through the piping is facilitated and the unclogging action therein made more efficient whenever the cable is rotated. Power units for rotating a cable by a gas or an electric motor, as well as guiding and cutting devices for the cable tip, have been available for quite some time, and are very familiar to those skilled in the plumbing arts. Nevertheless, a rotating cable is still manually fed into the pipeline and, it is often required that the cable be pulled back and pushed forward, sometimes several repetitions in succession being necessary, in order to negotiate a joint or a blend in the pipeline, or to punch through an obstruction. All of such axial placements of the cable are manual, sometimes requiring a considerable force. Now the smaller capacity power units are of a handy size, on the order of a three-quarter inch drill, making it convenient to carry the unit in the hands for movement of the power unit together with the cable to effectuate an axial placement of the cable, as required. However, the longer and heavier cables need more power to rotate them, and consequently, require a larger power unit, which, unfortunately, is too heavy and bulky for movements along with the cable. Thus, a manual handling of the cable itself is again necessary. The cable is rotating, oscillating, and often very slippery and slimey, which means that management thereof is difficult, at the least, even though gloves are worn. Furthermore, under those conditions, it is exceedingly difficult to generate any appreciable amount of force in any axial thrusts of the cable. Clearly, a manageable implement for clamping and axial placement of the cable is called for to overcome the above described difficulties.

Therefore, to overcome the foregoing and other difficulties of the prior art, the general object of this invention is to provide a handy, useful cable clamping and positioning implement.

It is an object of this invention to provide a hand implement for clamping and axial placement of a rotating cable, which does not interfere with rotation of the cable.

Another object of this invention is the provision of a hand implement having adequate leverage to enable a secure clamping, without slippage, and a forceful axial placement of a rotating cable.

A further object of this invention is to provide a hand implement of relatively few component parts which is simple in operation for quick and convenient utilization thereof.

An additional object is to provide a cable clamping and positioning implement which is economical to produce bp utilizing conventional, currently available standardized components that lend themselves to standard mass production techniques.

For the purpose of illustrating the invention, there are shown in the drawings forms which are presently preferred; it being understood, however, that this invention is not limited to the precise arrangements and instrumentalities shown.

Other objects and a fuller understanding of the invention may be had by referring to the following description and claims, taken in conjunction with the accompanying drawing, in which:

FIGURE 1 is a perspective view illustrating the invented implement clamped about a cable;

FIGURE 2 is a perspective drawing showing the cable clamping and positioning implement in an open disposition;

FIGURE 3 is a partial cross sectional drawing of the invention taken in the direction of the arrows 3—3 of FIGURE 1;

FIGURE 4 is a partial sectional drawing taken in the direction of arrows 4—4 of FIGURE 2.

FIGURE 5 is a partial plan view representing an alternate embodiment of the invented implement; and FIGURE 6 is a partial plan view of FIGURE 5 in an open position.

Referring to the drawings in detail, wherein like numerals indicate like elements, there is shown in FIGURE 1 a representation of the clamping and positioning implement of the present invention designated generally as 10. The implement 10 is shown clamped about a cable 15, which is a flexible type having a spiraled outer casing 17.

The components of the implement 10 may be formed by an integral casting of a high strength material, preferably a metal. Jaw members 20, 22 are formed in a C-shaped configuration to provide an opening 19, which loosely accommodates the cable 15 between a pair of the jaw members 20, 22 at a closed position, as may be best pictured with reference to FIGURE 3. The configurations of jaw members 20, 22 include extension portions 23, 25 respectively, which extend axially along the cable 15 to form a tubular sleeve thereabouts. A slot 26 and 28 in each jaw member 20, 22, respectively, extends radially across the opening 179, as shown, for purposes to be discussed herein shortly.

A hinge lug 31 projects from an open end of the C-shape at approximately the midpoint of extension portion 23. A pair of spaced hinge lugs 30, 32, are similarly positioned with respect to the extension portion 25. The hinge lugs are aligned in position with lug 31 between lugs 30, 32, and pinned together by a hinge pin 35 to form a durable hinge connection for opening and closing the jaw members.

A pair of rollers 40, 42 and 44, 46 are journaled within the slots 26, 28 provided therefor in each of the jaw members 20, 22, respectively. As shown in FIGURE 3, the rollers are journaled at symmetric positions with each roller projecting outward into the opening 19. The flat surfaces at opposite ends of the rollers may, on occasion, bear against the sides of these slots 26, 28, and therefore, adequate lubrication, such as grease, oil or graphite, is applied therebetween. Thus, each roller 40, 42, 44, 46 is free to rotate about its own shaft 41, 43, 45, 47, respectively. All of the shafts have a head at one end and a threaded portion at the opposite end. An appropriate socket may be provided in each head of the shafts 40, 42, 44, 46 as shown, for the insertion therein and cooperation therewith of a tool (an Allen wrench) corresponding to the sockets. Thus, with reference to FIGURE 4, all shafts may be screwed firmly in place against the lock washers 48, in the manner that shafts 45 and 47 are shown affixed in jaw member 22. Naturally, in place of sockets, the heads of shafts 41, 43, 45, 47 may be slotted or appropriately shaped for cooperation with a turning tool, such as a screw driver, or a wrench. It may be clearly visualized that a quick and convenient interchange between different sizes and types of rollers, as described below, can be accomplished by a mere removal and replacement of the shafts 41, 43, 45 and 47. The rollers may be fabricated out of a metal, plastic, or a hard rubber, and may have roughened or knurled surfaces for a sure, slip-proof gripping of the cable 15.

An effective and forceful axial thrust may be developed by utilizing the spiraled outer casing 17 as a screw for feeding the cable. This may be accomplished by providing a raised ridge 49 around the circumference of each roller, as demonstrated by the alternate embodiment of FIGURE 6. Notice that the ridges 49 are spaced axially apart from each other, and therefore, each ridge 49 provides a point on an incline corresponding to the pitch of the spiraled outer casing 17. For this purpose, the ridge 49 is shown at different positions, axially, with respect to each of the rollers 44′ and 46′. Alternately, the rollers could be identical, with a ridge 49, say, at the midpoint of each, if a sufficient clearance is provided between the sides of slot 28′ and the rollers. The clearance would enable a slight axial movement by each roller to compensate for the required axial spacing, upon insertion of the cable 15 into the implement 10.

A pair of handle members 50, 51 are integrally formed with the jaw members 20, 22, each handle projecting from an open end of the C-shape opposite the hinge formed by lugs 30, 31 and 32. The handle members 50, 51 provide levers pivoting on hinge pin 35. The length of handle members 50, 51 may be chosen to provide a considerable mechanical advantage by leverage for a secure clamping and axial placement of a cable 15 therebetween.

The alternate embodiment as illustrated in FIGURE 5 has sets of rollers at each end of the extension portions 23′, 25′, and a different hinge and handle arrangement from the embodiment of FIGURES 1–4, otherwise, in all other respects, the two embodiments shown are identical. A pair of hinge lugs 36, 37, joined by hinge pins 38, are provided, as shown, at spaced positions near each set of rollers. The handle members 50′, 52′ extend from the midpoints of the extension portions 23′, 25′, respectively.

The implement 10 of the invention, as described above, may be utilized, whenever desired, for clamping and axial placement of a rotating cable 15. The handle members 50, 52 are spread apart to place the implement 10 in an open disposition. A rotating cable 19 may be placed on a pair of rollers 42, 40, 44, 46, and the implement closed by bringing the handle members 50, 52 together, as shown in FIGURE 1. The rotating cable 15 does not contact the jaw members 20, 22, but is disposed therebetween in the opening 19. The cable 15 is supported therein entirely by the pairs of rollers 40, 42, 44, 46, which roll with the cable 15. The handle members 50, 52 may be squeezed together to exert a considerable pressure on the rotating cable 15, through the rollers, and thereby securely clamp the cable. Although the rollers 40, 42, 44, 46 bear tightly against the cable to prevent any axial slippage with respect to the implement 10, the rotation of the cable is not hindered because the rollers roll with the cable. The tubular sleeve, formed by the closed extension portions 23, 25, maintains an axial alignment between the cable 15 and the implement 10, thereby insuring that the rollers are in a correct disposition against the cable. If a lighter, smaller diameter cable is being used, it may be necessary to interchange the rollers and substitute rollers of larger diameter to accommodate the smaller cable diameter. A considerable amount of axial thrust for the rotating cable is available by utilizing the leverage of the handle members 50, 52, for movement forward and backward, as desired. In this manner, the invented implement 10 may be effectively utilized to unclog and clear a pipeline.

The present invention may be embodied in other specific forms without departing from the spirit or essential attributes thereof, and, accordingly, reference should be made to the append claims, rather than to the foregoing specification as indicating the scope of the invention.

What is claimed is:

1. An implement to clamp and position a cable, comprising: a pair of jaws hinged together to open and close about said cable; a sleeve section extending from each of said jaws axially along said cable to provide a tubular sleeve closed thereabout; and a pair of handle members, one projecting each of said jaws to provide lever for a closing and clamping of said jaws about said cable sufficient to secure said cable therein for an axial placement thereof by said implement.

2. An implement to clamp and position a rotating cable, comprising: a pair of jaws hinged together to open and close about said rotating cable; said jaw members extending axially along said cable to form a tubular sleeve closed thereabout; means within said jaws for bearing against said cable and allowing a rotation of said cable with respect to said jaws; and a pair of handle members, one projecting from each of said jaws to provide levers for closing and clamping of said jaws with said means bearing against said cable sufficiently to secure said cable therein for an axial placement thereof by said implement.

3. An implement in accordance with claim 2 wherein said means are rollers journaled in said jaws.

4. An implement in accordance with claim 2 wherein said means are pairs of rollers, one pair journaled in each of said jaws, respectively.

5. An implement in accordance with claim 3 wherein said rollers are readily removable and interchangeable with other sizes and types thereof.

6. An implement in accordance with claim 2 wherein said jaws are C-shaped members.

7. An implement to clamp and position a rotating cable, comprising: a pair of jaw members having configurations of C-shape to accommodate said rotating cable therebetween; a hinge affixed to an open end of said C-shape at each of said configurations to join said jaw members together for opening and closing about said cable: said configurations of said jaw members extending axially along said cable to form a tubular sleeve closed thereabout; a pair of rollers journaled in each of said jaw members to bear against said cable therebetween and allow a rotation thereof with respect to said jaw members; and a pair of handle members, one projecting from open end of said C-shape opposite said hinge of each of said configurations to provide levers for closing and clamping of said jaws with said rollers bearing against said cable sufficiently to secure said cable therein for an axial placement thereof by said implement.

8. An implement in accordance with claim 7 wherein said hinge is approximate the midpoint of said sleeve and said handle members and rollers are at one end of said sleeve.

9. An implement in accordance with claim 7 wherein said sleeve includes a hinge and pairs of rollers approximate each end of said sleeve therebetween with said handle members at a midpoint of said sleeve.

10. An implement to clamp and position a rotating cable, comprising: a pair of jaws hinged together to open and close radially about said rotating cable, said jaws having an inner portion providing an opening therebetween for a loose accommodation of said cable and each jaw having wall portions defining a slot therewithin extending in the radial direction across said opening; a pair of rollers journaled in each slot to bear against said cable therebetween and allow a rotation thereof with respect to said jaws; and a pair of handle members, one projecting from each of said jaws to provide levers for closing and clamping of said jaws with said rollers bearing against said cable sufficiently to secure said cable therein for an axial placement thereof by manual movement of said implement.

11. An implement in accordance with claim 10 wherein said pair of rollers are journaled with a roller projecting outward into said opening at both sides thereof to provide a roller bearing surface thereat.

12. An implement in accordance with claim 10 wherein said pair of rollers includes a feed means for cooperation with a spiraled outer casing of said cable to axially advance said cable.

13. An implement in accordance with claim 12 wherein said feed means are inclined to a pitch corresponding to said spiraled outer casing.

14. An implement in accordance with claim 10 wherein said rollers are readily removable and interchangeable with other sizes and types thereof.

15. An implement in accordance with claim 10 wherein said rollers have knurled surfaces to grip said cable.

References Cited

UNITED STATES PATENTS

| 95,102 | 9/1869 | French | 81—3.44 |
| 2,674,911 | 4/1954 | Theis | 81—3.44 |

FOREIGN PATENTS 283,408  4/1915  Germany.

OTHELL M. SIMPSON, *Primary Examiner*.